United States Patent [19]

Schneider et al.

[11] Patent Number: 5,681,876
[45] Date of Patent: Oct. 28, 1997

[54] PULVERULENT PIGMENT PREPARATION

[75] Inventors: Manfred Schneider; Dieter Schnaitmann, both of Eppstein; Rainer Klein, Idstein; Albert Münkel, Liederbach, all of Germany

[73] Assignee: Hoechst Aktiengesellschaft, Germany

[21] Appl. No.: 670,524

[22] Filed: Jun. 27, 1996

[30] Foreign Application Priority Data

Jun. 27, 1995 [DE] Germany ............ 195 23 204.6

[51] Int. Cl.$^6$ .................. C08J 3/20; C08L 29/04; C08K 3/20; C08K 5/23
[52] U.S. Cl. .................. 523/351; 523/200; 524/190; 524/431; 524/557; 524/803
[58] Field of Search ............ 524/557, 190, 524/431, 803; 523/200, 351

[56] References Cited

U.S. PATENT DOCUMENTS

| | | | |
|---|---|---|---|
| 3,652,313 | 3/1972 | Nagata et al. | 524/557 |
| 4,960,935 | 10/1990 | Dietz et al. | 564/325 |
| 4,997,870 | 3/1991 | Schilling et al. | 524/423 |
| 5,420,315 | 5/1995 | Uhrig et al. | 554/96 |
| 5,576,384 | 11/1996 | Nölken et al. | 524/806 |

FOREIGN PATENT DOCUMENTS

| | | |
|---|---|---|
| 1158384 | 12/1983 | Canada . |
| 0065751 | 12/1982 | European Pat. Off. . |
| 0582928 | 2/1994 | European Pat. Off. . |
| 2901462 | 7/1980 | Germany . |
| 2913176 | 10/1980 | Germany . |
| 3026127 | 2/1982 | Germany . |
| 3839865 | 5/1990 | Germany . |

*Primary Examiner*—Tae Yoon
*Attorney, Agent, or Firm*—Connolly and Hutz

[57] ABSTRACT

Pulverulent pigment preparation comprising a) an organic or inorganic pigment, b) a compound from the group consisting of novolaks, alkoxylated fatty alcohols, bisphenol polyglycol ethers, alkoxylated fatty amines, alkoxylated fatty acids or the esterification and/or arylation products prepared from a natural or modified castor oil fatty compound, which are alkoxylated and, if desired, esterified with dicarboxylic acids to form linked structural repeating units, c) a water-soluble mixture of polyvinyl alcohol and vinyl alcohol or of vinyl alcohol copolymers, and d) further customary additives, the sum of all components being 100% by weight. Plasters and emulsion paints are pigmented by simply stirring in the pulverulent pigment preparation.

18 Claims, No Drawings

PULVERULENT PIGMENT PREPARATION

DESCRIPTION

Pulverulent pigment preparation

The invention relates to readily dispersible pulverulent pigment preparations for pigmenting plasters and architectural coating dispersions based on synthetic resin.

State of the art for the pigmentation of plasters and emulsion paints are aqueous pigment dispersions which are stirred into the white dispersion and mixed in order to tint it. Examples of pigments which can be employed are azo, laked azo, naphthol, isoindolinone, isoindoline, phthalocyanine, quinacridone, quinophthalone and diketopyrrolopyrrole pigments, but also inorganic pigments, especially oxide pigments, as aqueous or aqueous-organic preparations.

At the dispersion stage in the preparation of the known pigment dispersions, use is made of the customary anionic, cationic or nonionic dispersants, alone or in combination, examples being alkyl sulfates, alkylsulfonates, alkyl phosphates, alkylbenzenesulfonates, octadecyl phosphates, dodecylbenzenesulfonates and sulfosuccinic esters, condensation products of fatty acid and taurine or hydroxyethanesulfonic acid, and reaction products of ethoxylated alkylphenols and fatty alcohols with chlorosulfonic acid and phosphorus oxychlorides (Winnacker, Küchler, "Chemische Technologie", Vol. 4, Carl Hanser Verlag, Munich 1960). Cationic surfactants employed are quaternary ammonium salts, for example hexadecyltrimethylammonium chloride. The aqueous preparations are prepared in a known manner in dispersion equipment such as dissolvers, rotor-stator mills, ball mills, high-speed turbulent mixers, kneading apparatus or on roller beds.

In some cases the aqueous preparations include organic solvents, such as glycols, for example. Propylene glycol, which is added to prevent drying out or to make the formulation more frostproof, causes odor problems and cannot be employed in non-VOC (volatile organic compound) preparations.

If these liquid preparations, after having been adjusted to a sprayable viscosity, are dried in, for example, a spray dryer, to form a powder, then the resulting powders are flowable only in exceptional cases, and in addition do not have the required performance properties. The spraying operation is often hampered by nozzle blockage, deposits on the walls of the spray tower, or agglomeration of the sprayed material. Even when the pigment/dispersant ratios are optimized, spray drying still leads only to pigment powders whose flowability is inadequate and which do not meet the required performance properties in terms of parameters such as flocculation stability, dispersibility and color properties in the application media.

Deficient dispersion properties can be the result, for example, of reagglomeration of the dispersion during the spraying process or during introduction of the sprayed material into the white dispersions, owing to poor wetting. U.S. Pat. No. 4 997 870 describes pulverulent polyvinyl alcohols which are applied to pigment. The pigments involved in this case are mostly inorganic white pigments, whose small particle size means that they can be dried without predispersion. Organic pigments treated accordingly show deficient dispersion properties and inadequate color properties in the application media in question. There is therefore a need for pigment powder preparations which can be distributed rapidly and without residue in emulsion paints, by simple incorporation with stirring, to give flocculation-stable coatings which are free from bittiness, streaks and patches.

The object of the present invention was to find low-dust pulverulent pigment preparations which can be stirred readily into synthetic-resin dispersions and plasters and which give flocculation-stable coatings which are free from bittiness and streaks.

It has been found that pigment preparations defined below surprisingly achieve the object set.

The present invention provides pulverulent pigment preparations comprising a) an organic or inorganic pigment, b) a compound from the group consisting of novolaks, bisphenol polyglycol ethers, alkoxylated fatty alcohols, alkoxylated fatty amines, alkoxylated fatty acids or the esterification and/or arylation products prepared from a natural or modified castor oil fatty compound, which are alkoxylated and, if desired, esterified with dicarboxylic acids to form linked structural repeating units, c) a water-soluble mixture of polyvinyl alcohol and vinyl alcohol or of vinyl alcohol copolymers, and d) optionally further customary additives, the sum of all components being 100% by weight.

Particularly advantageous pulverulent pigment preparations are those consisting of from 25 to 80% by weight, preferably from 35 to 70% by weight, of component a), from 3 to 40% by weight, preferably from 10 to 30% by weight, of component b), from 2 to 40% by weight, preferably from 10 to 30% by weight, of component c), and from 0 to 7% by weight, preferably from 2 to 5% by weight, of component d).

Suitable inorganic pigments are oxide pigments, for example iron oxide, nickel titanium oxide, chromium titanium oxide, chromium oxide green or cobalt blue. Particularly suitable organic pigments are monoazo, disazo, laked azo, benzimidazolone, naphthol, isoindolinone, isoindoline, phthalocyanine, quinacridone, perylene, perinone, thioindigo, quinophthalone, dioxazine and diketopyrrolopyrrole pigments.

Novolaks which are of interest for the present invention are preferably the alkoxylated aldehyde-alkylphenol condensation products described in U.S. Pat. No. 4 403 077 and U.S. Pat. No. 4 369 270, especially alkylphenol novolak polyglycol ethers, a 7-ring novolak with 105 ethylene oxide units (EO), which is subsequently reacted to give the benzoic acid partial ester and sulfosuccinic monoester sodium salt (example 3.5.3 in U.S. Pat. No. 4 403 077) and a 7-ring novolak with 105 EO as in Example 2 of U.S. Pat. No. 4 369 270.

Examples of bisphenol polyglycol ethers are described in U.S. Pat. No. 4 960 935, Example 1, and in CA-A-1 158 384, Example 1.

Alkoxylated fatty alcohols employed are preferably $C_{12}$–$C_{18}$ fatty alcohols having 2 to 50 ethylene oxide units and/or propylene oxide units. Alkoxylated fatty amines employed are preferably $C_8$–$C_{22}$ fatty amines having 2 to 30 ethylene oxide units and/or propylene oxide units. Alkoxylated fatty acids employed are preferably $C_8$–$C_{26}$ fatty acids having 6 to 30 ethylene oxide units and/or propylene oxide units.

The above-described, esterified and alkoxylated castor oil fatty compound preferably consists of from 1 to 10 units of the formula (Ia)

from 1 to 72 monovalent radicals of the formula (Ib)

and additionally, where two or more units of the formula (Ia) are present, of from 1 to 9 divalent groups of the formula (Ic)

each of the free valencies indicated in the formula units (Ia) being defined such that independently of the others it is attached directly to in each case one formula unit (Ib) or one valency of the formula unit (Ic), and, in the formula units (Ia) to (Ic)

A is the radical of a natural or modified castor oil or the radical of a natural or modified ricinoleic acid;

D is a direct bond or a divalent radical of a straight-chain or branched dihydric to hexahydric alcohol having 2 to 8 carbon atoms or a divalent radical of an alkylolamine HO—$(CH_2)_v$—$[NH—(CH_2)_u]_a$—$NH_2$,

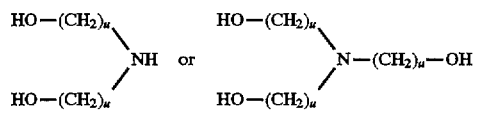

in which a is an integer from 0 to 4, u and v are identical or different and are integers from 2 to 14 and each, or some of, the OH, NH or $NH_2$ groups is or are alkoxylated;

E is a straight-chain, branched or cyclic aliphatic radical having 0 to 20 carbon atoms; an aromatic radical having 6 to 10 carbon atoms; an alkenyl radical based on a dimerized, unsaturated $C_{28}$–$C_{72}$ fatty acid; or a group of the formula —CH=CH—, —$CH_2CH(SO_3M)$— or —$CH(SO_3M)CH_2$—, where M is a cation;

X is a group of the formula —$CH_2CH_2$—, —$CH(CH_3)CH_2$— or —$CH_2CH(CH_3)$—, or a combination thereof;

Z is at each occurrence an identical or different radical $Z^1$ to $Z^6$, where $Z^1$ is hydrogen, $Z^2$ is an acyl radical of the formula $R^1$—CO— in which $R^1$ is a phenyl, naphthyl or hydroxynaphthyl radical, $Z^3$ is an acyl radical of an unmodified or modified natural resin acid, $Z^4$ is an acyl radical of a di- or tricarboxylic acid based on a dimerized or trimerized $C_{28}$–$C_{72}$ fatty acid, or an acyl radical of a saturated or unsaturated $C_8$–$C_{22}$ fatty acid, $Z^5$ is at each occurrence an identical or different radical of the formula —CO—$(CH_2)_q$—COOM, —CO—CH=CH—COOM, —CO—$CH_2$—$CH(SO_3M)$—COOM, —CO—$CH(SO_3M)$—$CH_2$—COOM or —OC—$C_6H_4$—COOM, where q is an integer from 0 to 10, and where M is hydrogen; an alkali metal; one equivalent of an alkaline earth metal; an oxyalkyl radical of the formula (X—O—)$_n$H; an ammonium group which is unsubstituted or substituted by from one to four $C_1$–$C_5$-alkyl radicals or from one to four $C_2$–$C_5$-alkylol radicals; an ammonium group which is obtained from ammonia or from $C_1$–$C_5$-alkylamines or $C_2$–$C_5$-alkylolamines by addition reaction with from 1 to 150 ethylene oxide units or propylene oxide units or with a combination of ethylene oxide units and propylene oxide units; or a group of the formula (II)

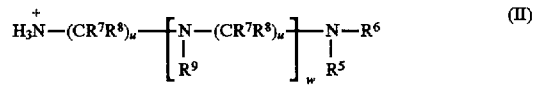

in which $R^9$, $R^5$ and $R^6$ are identical or different and are each a hydrogen atom or a hydroxyalkyl group having 1 to 6 carbon atoms, and $R^7$ and $R^8$ are identical or different and are each hydrogen or methyl, u is identical or different at each occurrence and is an integer from 2 to 14, and w is an integer from zero to 25; or where M is a group of the formula (III)

where $R^{10}$ is the group H(—O—X—)$_y$, where X is as defined above and y is an integer from 1 to 100,

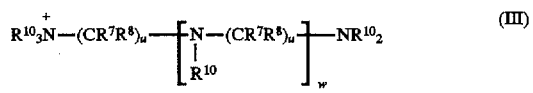

m if A is a ricinoleic acid radical, is 1, and if A is a castor oil radical, is 1 or 2, n is a number from 1 to 250, p if A is a castor oil, is 0, and if A is a ricinoleic acid radical, is 1, and r is a number from 1 to 6, and in which at least one radical Z from the group $Z^2$, $Z^3$, $Z^4$ and $Z^5$ is attached in the manner of an ester to A; or in which at least two units of the formula (Ia) are linked to one another via a divalent group of the formula (Ic), and Z is as defined for $Z^1$ to $Z^5$. If desired, the terminal hydroxyl groups of these castor oil fatty compound alkoxylates are also partially or completely esterified with one or more of the radicals $Z^2$ to $Z^5$.

The preparation of the above-described, esterified and alkoxylated castor oil fatty compounds is described in U.S. Pat. No. 5 420 315.

The term castor oil fatty compound refers to natural or modified castor oil or to natural or modified ricinoleic acid. The term modified castor oil refers to a singly or multiply hydrogenated or a singly or multiply arylated castor oil. The term modified ricinoleic acid refers to a hydrogenated or arylated ricinoleic acid. Arylated in this context denotes that a phenolcarboxylic acid, preferably a hydroxynaphthoic acid or a derivative thereof, is added onto an olefinic double bond of the castor oil fatty compound.

The castor oil fatty compound on which the group A is based is, for example, commercial castor oil, essentially consisting of a glyceride of ricinoleic acid, oleic acid, linoleic acid and stearic acid, or is singly or multiply hydrogenated castor oil, hydrogenated ricinoleic acid, castor oil which is singly or multiply arylated with hydroxynaphthoic acids or derivatives of hydroxynaphthoic acids, or singly arylated ricinoleic acid. Natural castor oil contains free hydroxyl groups and olefinic double bonds.

In accordance with the invention there is particular interest in those compounds containing 1 to 5 units of the formula (Ia), in which A is the radical of a natural or modified castor oil and p is therefore 0, X is —$CH_2CH_2$— and n is an integer from 5 to 125, preferably from 10 to 80.

Also of particular interest are those compounds containing 1 to 5 units of the formula (Ia), in which A is the radical of a natural or modified ricinoleic acid and p is 1, D is a divalent radical of a straight-chain or branched dihydric to hexahydric alcohol having 2 to 6 carbon atoms or of a $C_2$–$C_3$-alkylolamine, $C_2$–$C_3$-alkylol-$C_2$–$C_3$-alkylenediamine, $C_2$–$C_3$-alkylol-di-$C_2$–$C_3$-alkylenetriamine or $C_2$–$C_3$-alkylol-tri-$C_2$–$C_3$-alkylenetetramine, X is —$CH_2CH_2$— and n is an integer from 5 to 125, preferably from 10 to 80.

Also of particular interest are those compounds containing 2 to 9 monovalent radicals of the formula (Ib), in which Z at each occurrence is an identical or different radical of the formula $Z^2$, $Z^3$, $Z^4$ or $Z^5$, Preferably $Z^3$ or $Z^5$.

Also of particular interest are those compounds containing 1 to 4 divalent groups of the formula (Ic), in which E is a straight-chain, branched or cyclic aliphatic alkylene radical having 2 to 10 carbon atoms, preferably ethylene, butylene, pentylene, hexylene or decylene; a phenylene radical; or a group of the formula —CH=CH—, —CH$_2$CH (SO$_3$M)— or —CH(SO$_3$M)CH$_2$—, where M is a cation.

Where the starting material employed is a natural or modified ricinoleic acid, it is expedient to esterify the free carboxyl group of the ricinoleic acid using a dihydric to hexahydric alcohol on which the radical D is based or using an alkylolamine. Said esterification is carried out before the alkoxylation step b), as described in U.S. Pat. No. 5 420 315. Compounds which are of particular interest for the esterification of the free carboxyl groups of ricinoleic acid are glycerol, diglycerol, polyglycerols, 1,2,4-butanetriol, 1,4-butanediol, glycol, polyglycols, 1,1,1-trimethylolethane, 1,1,1-trimethylolpropane, pentaerythritol, 2,4-dihydroxy-3-methylolpentane, hexanetriol, sorbitol, anhydrosorbitol, hexitol and mannitol, and also mono-, di- and triethanolamine, and furthermore alkylolamines, such as N-(2-hydroxyethyl)-1,2-diaminoethane, N-(2-hydroxyethyl)diethylenetriamine, N-(2-hydroxyethyl)triethylenetetramine and 2-aminoethanol.

The aromatic carboxylic acids on which the acyl radical $Z^2$ is based are, for example, benzoic acid, 1-naphthoic acid or 2-naphthoic acid and hydroxynaphthoic acids, preferably 1-hydroxy-4-naphthoic acid, 2-hydroxy-1-naphthoic acid, 3-hydroxy-1-naphthoic acid, 5-hydroxy-1-naphthoic acid, 6-hydroxy-1-naphthoic acid, 7-hydroxy-1-naphthoic acid, 8-hydroxy-1-naphthoic acid, 1-hydroxy-2-naphthoic acid, 3-hydroxy-2-naphthoic acid, 5-hydroxy-2-naphthoic acid, 6-hydroxy-2-naphthoic acid, 7-hydroxy-2-naphthoic acid and 1-hydroxy-3-naphthoic acid.

The resin acids on which the acyl radical $Z^3$ is based are natural or modified resin acids, for example abietic acid, dehydroabietic acid, dihydroabietic acid, tetrahydroabietic acid, levopimaric acid, dextropimaric acid and isodextropimaric acid, as are present in commercially available rosins, and also disproportionated, hydrogenated and dimerized resin acids.

The fatty acids on which the acyl radical $Z^4$ is based are dimerized or trimerized fatty acids having 28 to 72, in particular 36 to 54, carbon atoms, and also saturated or unsaturated $C_8$–$C_{22}$ fatty acids, examples being octanoic acid, pelargonic acid, capric acid, undecanoic acid, lauric acid, tridecanoic acid, myristic acid, pentadecanoic acid, palmitic acid, heptadecanoic acid, stearic acid, nonadecanoic acid, arachidic acid, behenic acid, 10-undecenoic acid, lauroleic acid, myristoleic acid, palmitoleic acid, 6c- and 6t-octadecenoic acid, elaidic acid, oleic acid, linoleic acid and linolenic acid, especially even-numbered fatty acids or hydroxy fatty acids having in each case 8 to 20 carbon atoms, for example the even-numbered fatty acids mentioned correspondingly above, and in particular their mixtures obtained from natural products, such as tall oil fatty acid, tallow fatty acid, coconut oil fatty acid, palm oil fatty acid and linseed oil fatty acid, preferably the stated fatty acids having 12 to 18 carbon atoms.

The acids or carboxylic anhydrides on which the acyl radical $Z^5$ is based are, for example, maleic acid, maleic anhydride, fumaric acid, phthalic acid, phthalic anhydride, isophthalic acid, terephthalic acid, oxalic acid, malonic acid, succinic acid, succinic anhydride, glutaric acid, glutaric anhydride, adipic acid, pimelic acid, suberic acid, azelaic acid, sebacic acid and sulfosuccinic acid, preferably succinic acid, phthalic acid, terephthalic acid, maleic acid and fumaric acid, and especially sulfosuccinic acid.

Reaction products which are of particular interest in the context of the present invention are those of castor oil or ricinoleic acid with a resin acid on which the radical $Z^3$ is based, preferably a rosin, and ethylene oxide and/or propylene oxide, and, if desired, with a dicarboxylic acid on which the radical $Z^5$ is based.

Examples of particularly preferred reaction products are castor oil rosin ester ethoxylate disulfosuccinic monoester, di-rosin-castor oil ethoxylate sulfosuccinate, castor oil rosin ester alkoxylate dimaleic monoester and its triethylenetetramine salt, castor oil ethoxylate succinic ester ethoxylate rosin ester sulfosuccinate and castor oil rosin glycerol mixed esters. The preparation of these products is described in U.S. Pat. No. 5 420 315.

The water-soluble mixture of polyvinyl alcohol and vinyl alcohol is preferably a partially hydrolyzed polyvinyl alcohol with a degree of hydrolysis of from 70 to 92 mol %, preferably from 85 to 90 mol %, and an efflux viscosity (as a 4% strength aqueous solution) of from 2 to 20 mPas. The water-soluble mixture of vinyl alcohol copolymers is preferably a mixture of partially or completely hydrolyzed copolymers of alkylvinyl ester and vinyl acetate with proportions of alkylvinyl ester of from 5 to 20 mol % (efflux viscosities of from 2 to 20 mPas), especially copolymers of alkylvinyl acetate and vinyl acetate. Examples of such products are indicated under CAS No. 9002-89-5 and CAS No. 25213-24-5.

Examples of further suitable and customary additives are wetting agents, dedusting agents, antifoam agents and anticaking agents.

The novel pigment preparations are prepared by converting the pigment, which is expediently a finished or unfinished, usually commercially available pigment powder, into a finely divided state in an aqueous or aqueous-organic medium at a temperature of from 20° to 60° C. and at a pH of from 4 to 10 by continuous or discontinuous grinding or kneading, the components mentioned under b), c) and d) being added before, during or after the process of fine division, and converting the resulting, finely divided pigment dispersion to the dry state by an appropriate process, to obtain a fine flowable powder, for example by spray drying, belt drying or fluidized-bed drying.

The fine division of the pigment is expediently carried out by grinding and/or kneading of the aqueous or aqueous-organic, preferably aqueous or aqueous-alcoholic, suspension in an appropriate kneading apparatus or wet grinding apparatus, for example a dispersion kneading apparatus or a ball mill. Component b) is preferably added before fine division, component c) preferably during and/or after fine division, and component d) preferably during and/or after fine division and/or after drying. The overall concentration of solids in the suspension is expediently from 15 to 45% by weight, preferably 20 to 30% by weight. The duration of grinding or kneading is commonly from ½ to 4 hours. Fine division is normally reached when no more than 3% of the particles are larger than 1 μm and there are no fractions greater than 3 μm.

The suspensions prepared in this way are dried by continuous drying, preferably by spray drying in an appropriate spray-drying unit. To this end, the suspension is normally atomized to form fine drops using hot air in a dual-substance spray dryer, using spray nozzles or atomizer disks. The optimum gas inlet temperature must be determined by preliminary tests for each pigment suspension. Customary temperatures are from 140° to 230° C.

The particle size of the spray-dried products depends on that of the pigment suspension employed and is expediently adjusted by the choice of the combination of auxiliaries so as to provide flowability and ease of meterability.

Spray drying is carried out without the formation of threads and without wall deposits. It results in pulverulent, readily flowable, noncaking, highly concentrated pigment preparations.

The novel pulverulent pigment preparations meet all of the performance requirements placed on such preparations. The usually relatively high pigment content of the powders compared to the liquid formulations are manifested, in terms of the tinctorial strength which can be achieved, in the ratio of the pigment contents to one another. A lower color yield owing to retention of the auxiliaries does not occur. The incorporation and redispersion of the readily flowable and readily meterable pigment preparations in the various white emulsion paints, usually containing $TiO_2$ or $BaSO_4$, which are encountered in practice and which may be based, for example, on modified polyvinyl acetates, acrylates or styrene acrylates, are accomplished without problems simply by incorporation with stirring. Coating or brushing results in coatings which are free from bittiness, streaks and patches.

In addition to their outstanding performance properties, the powder preparations have considerable economic and environmental advantages. Costly disposal of plastic containers is done away with, since the novel powder preparations can be packaged in paper. Moreover, there are considerable savings in warehousing, since the powder preparations can often be formulated with twice the pigment content of the corresponding liquid formulations. Powders can be stored over a relatively long period without the use of preservatives, which are not completely unobjectionable from the environmental standpoint, and without impairment of quality. Deficient frost resistance, which often leads to disruptions in the case of liquid formulations, does not occur in the case of the powder preparations, even over prolonged periods. Since powders can be removed without residue from the appropriate containers, the cleaning and refilling of these containers presents no problems.

In the past there has been no lack of attempts to prepare pulverulent pigment preparations for the coloring of architectural paints, but there were always great problems in respect of redispersibility, flowability or the tinctoffal strength obtained. Only the novel combination of the stated components a) to d) has been able, surprisingly, to overcome all of these problems.

EXAMPLE 1

70 parts of C. I. Pigment Orange 5 (C. I. No. 12075) are pasted up in a dissolver with 100 parts of demineralized water, 16 parts of a 50% by weight aqueous formulation of castor oil rosin ester ethoxylate disulfosuccinic monoester, as described in U.S. Pat. No. 5 420 315, Preparation Example 2, and 70 parts of a 20% by weight aqueous solution of a partially hydrolyzed polyvinyl alcohol with a degree of hydrolysis of about 88% (the viscosity of a 4% by weight aqueous solution at 20° C. is 4 mPas), for example ®Mowiol 4–88, and the paste is then ground in a ball mill until finely divided. After separating off the glass beads and rinsing with 80 parts of water, the approximately 20% by weight suspension is dried in a dual-substance nozzle spray-drying tower. The gas inlet temperature is from 180° to 185° C. Drying takes place without disruption, to give 94 parts of a low-dusting readily flowable powder.

3 parts of this powder are stirred for 5 minutes by hand into 100 parts of a commercially available white emulsion paint to give a tinctorially strong, flocculation-stable coating which is free from bittiness and whose tinctorial strength is not significantly improved by stirring for 2 minutes with a high-speed stirrer. Increasing the level of pigmentation to 10% in the white emulsion paint also gives flocculation-stable coatings of great tinctorial strength which are free from bittiness.

EXAMPLE 2

65 parts of C. I. Pigment Red 112 (C. I. No. 12370) are pasted up in a dissolver with 70 parts of demineralized water, 15 parts of a 50% by weight aqueous formulation of the reaction product of castor oil and rosin, subsequently ethoxylated with about 80 ethylene oxide units per mole, as described in U.S. Pat. No. 5 420 315 Preparation Example 1, 90 parts of a 20% by weight aqueous solution of a partially hydrolyzed polyvinyl alcohol with a degree of hydrolysis of about 88 mol % (the viscosity of a 4% by weight aqueous solution at 20° C. is 4 mPas), and 2 parts of a water-soluble ammonium salt of a low molecular weight polyacrylic acid, and the paste is then ground in a ball mill with 1 mm siliquartzite beads, as in Example 1, until finely divided. After separating off the glass beads and rinsing with 90 parts of demineralized water, the approximately 20% by weight dispension is dried in a dual-substance nozzle spray-drying tower. The gas inlet temperature is from 150° to 155° C. Spray drying takes place without disruption, to give a dust-free, readily flowable powder.

3 parts of this pigment powder are stirred over the course of 5 minutes by hand into 100 parts of various commercially available white dispersions to give a tinctorially strong coating which is free from bittiness and whose tinctorial strength can be improved only gradually by stirring for 2 minutes with a high-speed stirrer.

EXAMPLE 3

68.5 parts of C. I. Pigment Red 5 (C. I. No. 12490) are pasted up in a dissolver with 110 parts of demineralized water, 20 parts of a 50% by weight aqueous formulation of the reaction product of castor oil and rosin, subsequently ethoxylated with about 80 ethylene oxide units per mole, as described in U.S. Pat. No. 5 420 315 Preparation Example 1,100 parts of a 20% by weight aqueous solution of a partially hydrolyzed polyvinyl alcohol with a degree of hydrolysis of about 88 mol %, as described in Example 1, and 5 parts of a 30% by weight aqueous solution of an ammonium salt of a low molecular weight polyacrylic acid, and the paste is then ground in a ball mill with 1 mm sillquartzite beads until finely divided (particle size of not more than 1 µm).

After separating off the glass beads and rinsing with 25 parts of demineralized water, the dispersion is dried in a spray-drying tower (gas inlet temperature 180° to 185° C.). Spray drying takes place without disruption and results in a dust-free, readily flowable powder which is stirred into various commercially available white dispersions and gives a flocculation-stable, tinctorially strong coating which is free from bittiness.

If the pigment indicated in Example 1 is replaced by the pigments indicated in the table below and the procedure is otherwise carried out as described above, the resulting powder preparations are likewise low-dusting, readily flowable, highly concentrated, readily dispersible and have good properties similar to those in Example 1. The period for which the suspension is ground until finely divided depends on the pigment and is between 30 and 90 minutes.

The following compounds are employed as component b):

A. bisphenol polyglycol ether prepared according to Example 1 of U.S. Pat. No. 4 960 935;

B. alkylphenol novolak polyglycol ether, prepared according to Example 2 of U.S. Pat. No. 4 369 270;

C. castor oil rosin ester alkoxylate dimaleic monoester triethylenetetramine salt prepared according to U.S. Pat. No. 5 420 315, Example 8;

D. double ricinoleic acid succinate diglycerol ester ethoxylate prepared according to U.S. Pat. No. 5 420 315, Example 19;

E. di-rosin castor oil ester ethoxylate sulfosuccinate prepared according to U.S. Pat. No. 5 420 315, Example 4.

from 0 to 7% by weight of component d).

3. A pulverulent pigment preparation as claimed in claim 1, consisting of
from 35 to 70% by weight of component a),
from 10 to 30% by weight of component b),
from 10 to 30% by weight of component c), and
from 2 to 5% by weight of component d).

4. A pulverulent pigment preparation as claimed in claim 1, wherein the pigment is an inorganic oxide pigment or a monoazo, disazo, laked azo, benzimidazolone, naphthol, isoindolinone, isoindoline, phthalocyanine, quinacridone, perylene, perinone, thioindigo, quinophthalone, dioxazine or diketopyrrolopyrrole pigment.

5. A pulverulent pigment preparation as claimed in claim 1, wherein component b) is an alkylphenol novolak polyglycol ether, a bisphenol polyglycol ether or an esterified and alkoxylated castor oil fatty compound consisting of from 1 to 10 units of the formula (Ia)
from 1 to 72 monovalent radicals of the formula (Ib)

| Ex. No. | Pigment | Surface-active compound | Partially hydrolyzed polyvinyl alcohol | Additional auxiliary |
|---|---|---|---|---|
| 4 | 65% C.I. Pigment Green 7 (C.I. No. 74260) | 10% compound A | 25% | — |
| 5 | 65% C.I. Pigment Red 5 | 10% compound B | 23% | polyacrylic acid, Na salt |
| 6 | 65% C.I. Pigment Yellow 74 (C.I. No. 11741) | 18% compound C | 17% | — |
| 7 | 50% C.I. Pigment Yellow 74 | 30% compound D | 20% | — |
| 8 | 70% Pigment black | 16% compound E | 14% | — |
| 9 | 70% C.I. Pigment Yellow 3 (C.I. No. 11710) | 10% compound E | 18% | 2% disperse silicic acid |
| 10 | 40% C.I. Pigment Yellow 3 | 25% compound A | 30% | 5% disperse silicic acid |
| 11 | 70% C.I. Pigment Yellow 42 (oxide yellow) | 15% compound B | 15% | — |
| 12 | 65% C.I. Pigment Blue 15:3 (C.I. No. 74160) | 15% compound E | 16% | 4% alkylammonium salt |

We claim:

1. A pigment preparation comprising
a) an organic or inorganic pigment
b) a compound selected from the group consisting of novolaks, hisphenol polyglycol ethers, alkoxylated fatty alcohols, alkoxylated fatty amines, alkoxylated fatty acids and the esterification and arylation products prepared from a natural or modified castor oil fatty compound, which are alkoxylated and optionally esterified with dicarboxylic acids to form linked structural repeating units,
c) a water-soluble mixture of polyvinyl alcohol and vinyl alcohol or of vinyl alcohol copolymers; and
d) optionally further additives, the sum of all components being 100% by weight; wherein said preparation is pulverulent.

2. A pulverulent pigment preparation as claimed in claim 1, consisting of
from 25 to 80% by weight of component a),
from 3 to 40% by weight of component b),
from 2 to 40% by weight of component c), and $$-Z \qquad\qquad (Ib),$$

and additionally, where two or more units of the formula (Ia) are present, of
from 1 to 9 divalent groups of the formula (Ic)

$$-CO-E-CO- \qquad\qquad (Ic),$$

each of the free valencies indicated in the formula units (Ia) being defined such that independently of the others it is attached directly to in each case one formula unit (Ib) or one valency of the formula unit (Ic), and, in the formula units (Ia) to (Ic)

A is the radical of a natural or modified castor oil or the radical of a natural or modified ricinoleic acid;

D is a direct bond or a divalent radical of a straight-chain or branched dihydric to hexahydric alcohol having 2 to 8 carbon atoms or a divalent radical of an alkylolamine $$HO-(CH_2)_v-[NH-(CH_2)_n]_u-NH_2,$$

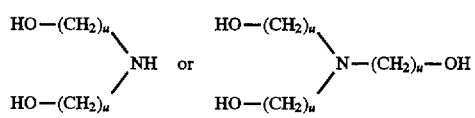
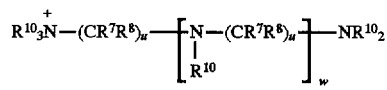

in which a is an integer from 0 to 4, u and v are identical or different and are integers from 2 to 14 and each, or some of, the OH, NH or $NH_2$ groups is or are alkoxylated;

E is a chemical bond or a straight-chain, branched or cyclic aliphatic radical having up to 20 carbon atoms;

an aromatic radical having 6 to 10 carbon atoms;

an alkenyl radical based on a dimerized, unsaturated $C_{28}$–$C_{72}$ fatty acid;

or a group of the formula —CH=CH—, —$CH_2$CH($SO_3$M)— or —CH($SO_3$M)$CH_2$—, where M is a cation;

X is a group of the formula —$CH_2CH_2$—, —CH($CH_3$)$CH_2$— or —$CH_2$CH($CH_3$)—, or a combination thereof;

Z is at each occurrence an identical or different radical $Z^1$ to $Z^6$, where $Z^1$ is hydrogen, $Z^2$ is an acyl radical of the formula $R^1$—CO— in which $R^1$ is a phenyl, naphthyl or hydroxynaphthyl radical, $Z^3$ is an acyl radical of an unmodified or modified natural resin acid, $Z^4$ is an acyl radical of a di- or tricarboxylic acid based on a dimerized or trimerized $C_{28}$–$C_{72}$ fatty acid, or an acyl radical of a saturated or unsaturated $C_8$–$C_{22}$ fatty acid, $Z^5$ is at each occurrence an identical or different radical of the formula —CO—$(CH_2)_q$—COOM, —CO—CH=CH—COOM, —CO—$CH_2$—CH($SO_3$M)—COOM, —CO—CH($SO_3$M)—$CH_2$—COOM or —OC—$C_6H_4$—COOM, where q is an integer from 0 to 10, and where M is hydrogen; an alkali metal; one equivalent of an alkaline earth metal; an oxyalkyl radical of the formula (X—O—)$_n$H; an ammonium group which is unsubstituted or substituted by from one to four $C_1$–$C_5$-alkyl radicals or from one to four $C_2$–$C_5$-alkylol radicals; an ammonium group which is obtained from ammonia or from $C_1$–$C_5$-alkylamines or $C_2$–$C_5$-alkylolamines by addition reaction with from 1 to 150 ethylene oxide units or propylene oxide units or with a combination of ethylene oxide units and propylene oxide units; or a group of the formula (II)

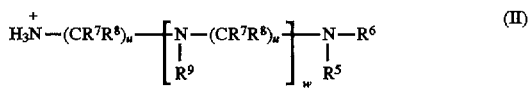

in which $R^9$, $R^5$ and $R^6$ are identical or different and are each a hydrogen atom or a hydroxyalkyl group having 1 to 6 carbon atoms, and $R^7$ and $R^8$ are identical or different and are each hydrogen or methyl, u is identical or different at each occurrence and is an integer from 2 to 14, and w is an integer from zero to 25; or where M is a group of the formula (III)

$$\overset{+}{R^{10}{}_3N}-(CR^7R^8)_u-\left[\underset{R^{10}}{\overset{|}{N}}-(CR^7R^8)_u\right]_w-NR^{10}{}_2 \quad (III)$$

where $R^{10}$ is the group H(—O—X—)$_y$, where X is as defined above and y is an integer from 1 to 100, m if A is a ricinoleic acid radical, is 1, and if A is a castor oil radical, is 1 or 2, n is a number from 1 to 250, p if A is a castor oil, is 0, and if A is a ricinoleic acid radical, is 1, and r is a number from 1 to 6, and in which at least one radical Z from the group $Z^2$, $Z^3$, $Z^4$ and $Z^5$ is attached in the manner of an ester to A; or in which at least two units of the formula (Ia) are linked to one another via a divalent group of the formula (Ic), and Z is as defined for $Z^1$ to $Z^5$.

6. A pulverulent pigment preparation as claimed in claim 5, wherein the esterified and alkoxylated castor oil fatty compound contains 1 to 5 units of the formula (Ia), in which A is the radical of a natural or modified castor oil and p is therefore 0, X is —$CH_2CH_2$— and n is an integer from 5 to 125, preferably from 10 to 80.

7. A pulverulent pigment preparation as claimed in claim 5, wherein the esterified and alkoxylated castor oil fatty compound contains 1 to 5 units of the formula (I) in which A is the radical of a natural or modified ricinoleic acid and p is 1, D is a divalent radical of a straight-chain or branched dihydric to hexahydric alcohol having 2 to 6 carbon atoms or of a $C_2$–$C_3$-alkylolamine, $C_2$–$C_3$-alkylol-$C_2$–$C_3$-alkylenediamine, $C_2$–$C_3$-alkylol-di-$C_2$–$C_3$-alkylenetriamine or $C_2$–$C_3$-alkylol-tri-$C_2$–$C_3$-alkylenetetramine, X is —$CH_2CH_2$— and n is an integer from 5 to 125.

8. A pulverulent pigment preparation as claimed in claim 7, wherein n is an integer from 10 to 80.

9. A pulverulent pigment preparation as claimed in claim 1, wherein component b) is castor oil rosin ester ethoxylate disulfosuccinic monoester, di-rosin-castor oil ethoxylate sulfosuccinate, castor oil rosin ester alkoxylate dimaleic monoester or its triethylenetetramine salt, castor oil ethoxylate succinic ester ethoxylate rosin ester sulfosuccinate or a castor oil rosin glycerol mixed ester.

10. A pulverulent pigment preparation as claimed in claim 1, wherein component c) is a partially hydrolyzed polyvinyl alcohol with a degree of hydrolysis of from 70 to 92 mol % or a partially or completely hydrolyzed copolymer of alkylvinyl ester and vinyl acetate with proportions of alkylvinyl ester of from 5 to 20 mol %.

11. A process for the preparation of a pulverulent pigment preparation as claimed in claim 1, which comprises converting the pigment into a finely divided state in an aqueous or aqueous-organic medium by continuous or discontinuous grinding or kneading, the components mentioned under b), c) and d) being added before, during or after the process of fine division, and converting the resulting finely divided pigment dispersion to the dry state to obtain a fine, flowable powder.

12. The process as claimed in claim 11, wherein the finely divided pigment dispersion is converted to the dry state by spray drying, belt drying or fluidized-bed drying.

13. A method of pigmenting an aqueous emulsion paint or a plaster comprising the step of incorporating a pulverulent pigment preparation as claimed in claim 1.

14. A pulverulent pigment preparation as claimed in claim 1, which comprises:
   from 25 to 80% by weight of component a),
   from 3 to 40% by weight of component b),
   from 2 to 40% by weight of component c), and
   from 0 to 7% by weight of component d).

15. A pulverulent pigment preparation as claimed in claim 1, which comprises
   from 35 to 70% by weight of component a),
   from 10 to 30% by weight of component b),
   from 10 to 30% by weight of component c), and
   from 2 to 5% by weight of component d).

16. A pulverulent pigment preparation as claimed in claim 1, consisting essentially of:
   from 25 to 80% by weight of component a),
   from 2 to 40% by weight of component b),
   from 2 to 40% by weight of component c), and
   from 0 to 7% by weight of component d).

17. A pulverulent pigment preparation as claimed in claim 1, consisting essentially of
   from 35 to 70% by weight of component a),
   from 10 to 30% by weight of component b),
   from 10 to 30% by weight of component c), and
   from 2 to 5% by weight of component d).

18. A pulverulent pigment preparation as claimed in claim 1, wherein the additive is a wetting agent, a dedusting agent, an antifoam agent or an anticaking agent.

* * * * *